United States Patent [19]
Pratt et al.

[11] Patent Number: 5,543,850
[45] Date of Patent: Aug. 6, 1996

[54] SYSTEM AND METHOD FOR DISPLAYING CLOSED CAPTION DATA ON A PC MONITOR

[75] Inventors: Kyle A. Pratt; Michael A. Yonker, both of Allen; Frank L. Xu, Irving, all of Tex.

[73] Assignee: Cirrus Logic, Inc., Fremont, Calif.

[21] Appl. No.: 373,617

[22] Filed: Jan. 17, 1995

[51] Int. Cl.$^6$ ................................................. H04N 7/087
[52] U.S. Cl. ............................................. 348/617; 348/564
[58] Field of Search .................................. 348/468, 563, 348/564, 473, 476; H04N 7/087

[56] References Cited

U.S. PATENT DOCUMENTS

| | | | |
|---|---|---|---|
| 4,894,789 | 1/1990 | Yee | 348/468 |
| 4,991,018 | 2/1991 | Davies | 348/468 |
| 5,111,296 | 8/1992 | Duffield et al. | 348/468 |
| 5,262,860 | 11/1993 | Fitzpatrick | 348/468 |
| 5,375,160 | 12/1994 | Guidon et al. | 348/468 |

*Primary Examiner*—Victor R. Kostak
*Attorney, Agent, or Firm*—Fulbright & Jaworski

[57] ABSTRACT

An apparatus for capturing and decoding the closed caption data from a television signal and displaying the closed caption data, along with the video picture, in a windowing environment on the monitor of a personal computer system. The closed caption decoder device stores the line of video data containing the closed caption text in an object in the frame buffer of the PC. The host CPU reads the raw video data from the frame buffer and stores it in system memory. The host CPU parses the line of video data to separate the two ASCII characters representing closed caption data from the color burst information and synchronizing clock information. After the closed caption data has been retrieved and parity-checked, the closed caption data may be displayed in a window of user-determined size and location on the monitor of the PC, independent of the size and location of the video image window corresponding to the closed caption text.

22 Claims, 2 Drawing Sheets

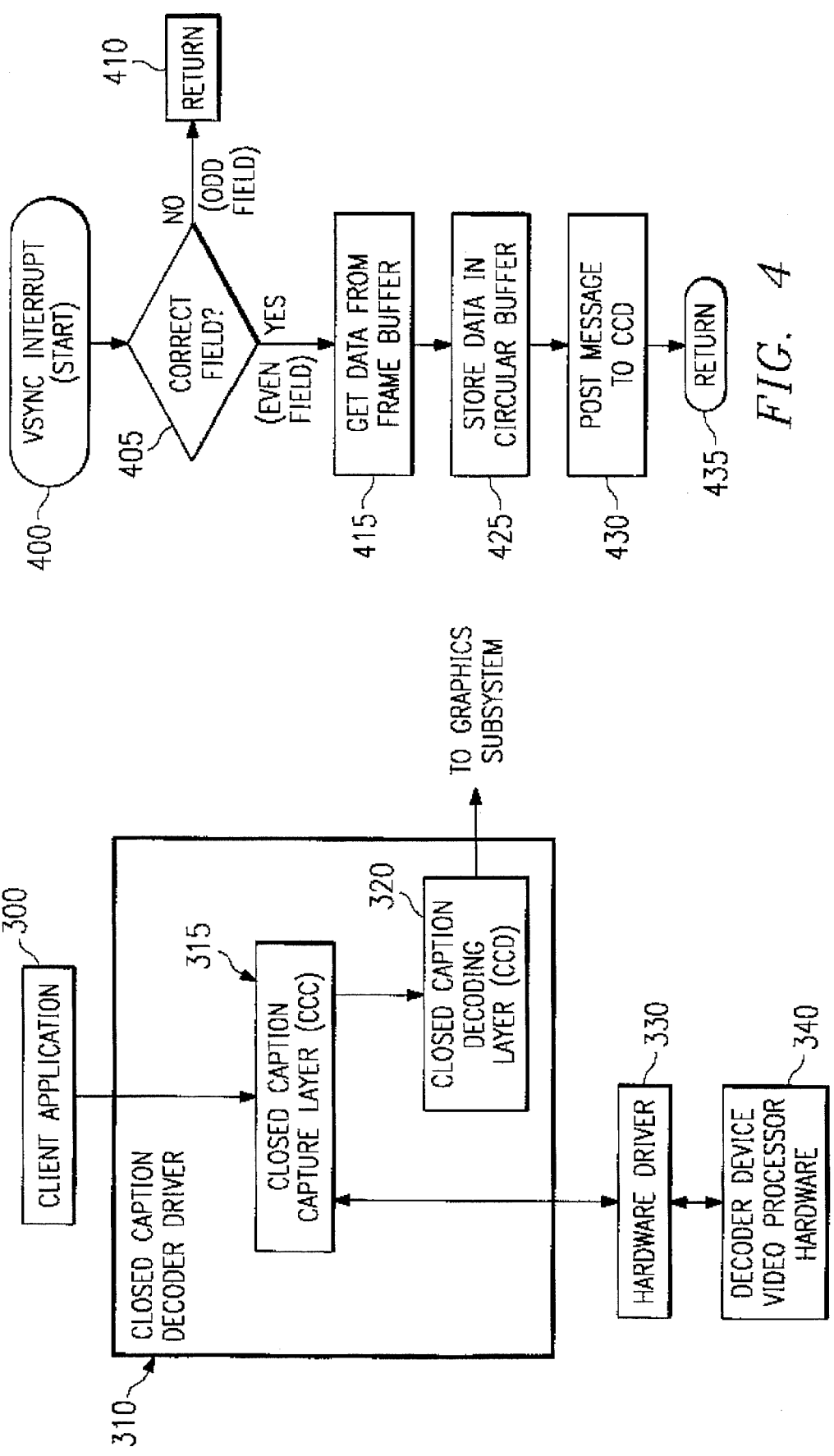

SYSTEM AND METHOD FOR DISPLAYING CLOSED CAPTION DATA ON A PC MONITOR

TECHNICAL FIELD OF THE INVENTION

This invention relates to the display of video information on the screen of a PC monitor and more particularly to a system and method for the displaying of closed caption video information derived from a video stream on the monitor of a PC.

BACKGROUND OF THE INVENTION

As the number and type of multimedia applications for personal computers (PC) continues to expand, both the need to and the capability to view television signals derived from broadcast, cable or video cassette signals in a window on the screen of a PC are becoming increasingly common place. Present F.C.C. rules and regulations require that all new television broadcast receivers having picture screens 13 inches or larger must be capable of displaying closed caption information. In a conventional TV set, closed caption information is decoded from the broadcast video signal and made ready for display on the bottom of the screen by use of dedicated video processors built into the television hardware.

There are no comparable F.C.C. rules and regulations pertaining to the display of closed caption information on PC monitors, nor are there any accepted industry-wide methods of capturing and displaying such information in a PC system.

While the same video processing hardware used in conventional television sets may be incorporated into PC monitors to display closed caption information on the monitor screen, there are several defects with this approach. Principally, using the same video processor hardware as conventional television sets will increase the complexity and cost of PC systems. This is particularly detrimental in view of recent trends in the PC market, which has seen a great drop in the price of PC systems, including monitors, as a result of greatly increased price competition. A second major drawback to using conventional television video processors to capture and display closed caption television on PC monitors results from the display of a TV or video quality picture in a windowing environment on a PC. While F.C.C. rules and regulations are adequate for displaying closed caption information in a minimize size font and in a dedicated location on picture screens 13 inches or larger, the window on a PC screen in which a video picture is displayed may in fact be quite small, for example less than four inches wide. While the television picture might be adequate for viewing in a PC window, the closed caption information is likely to be so small as to be unreadable.

There is therefore a need for systems and methods which can decode and display closed caption information on a computer in a windowing environment using the already existing video capture hardware resident in most PC systems.

There is a still further need for systems and methods of displaying closed caption information on a PC monitor without requiring application specific closed caption hardware.

There is a still further need for systems and methods that can decode, process and display closed caption information captured from a television signal on the monitor of a PC in an easily readable font size and format, regardless of the size and location of the window in which the video picture is displayed.

SUMMARY OF THE INVENTION

The present invention is a closed-caption decoder device which solves the foregoing problems inherent in the prior art by using existing video processors commonly found in personal computer systems to capture and decode closed-caption data from a video stream.

In the present invention, a client application requiring the display of closed-caption data from a video signal calls the closed-caption decoder driver to enable and display the closed-caption information. Two ASCII characters are captured from Line 21 of each TV frame by an input video processor which stores the data from Line 21 in a frame buffer. The input processor is responsible for capturing and storing the remainder of the video signal in the frame buffer for display on the video monitor of the personal computer. The captured video data of Line 21 is sampled by the host CPU which detects and analyzes 7 clock cycles located near the start of each line of video data. From this, the CPU derives the effective clock period of the data stored in Line 21 and uses the effective clock period to determine the rate at which the remainder of the Line 21 data is to be sampled.

Once the remainder of the Line 21 data has been sampled, the host CPU is able to determine the value of the two ASCII characters embedded in Line 21. The host CPU verifies the parity of the data captured in Line 21 and then verifies that the two ASCII characters meet the closed-caption specification prescribed by the FCC regulations. The closed-caption specification of the FCC requires that the first ASCII character be either printable or non-printable. The second ASCII character is always a printable character. If the first character is non-printable, then both characters of Line 21 comprise a control code. If the first character is printable, then both characters of Line 21 are defined to be part of the displayable text.

Once the two ASCII characters have been captured and validated, the host CPU may store the ASCII characters in the graphics buffer for display anywhere on the screen of the PC monitor. This presents numerous advantages over the systems disclosed in the prior art. Whereas the dedicated closed-caption decoding hardware used in conventional television sets displays closed-caption data in a dedicated area and in a dedicated size within the video picture, the host CPU of the personal computer may size and position the captured ASCII data anywhere on the display screen of the PC, including outside of the video window in which the video picture is displayed. Therefore, while the video picture itself may be displayed in a small window located in a corner of the screen of the PC, the closed-caption data may be displayed in large letters at the bottom of the screen of the PC monitor.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 is a logical flow diagram of the capturing and decoding of the closed caption data by the present invention; and FIG. 4 is a logical flow diagram of the interrupt service routine used by the host CPU of the present invention to retrieve data from the video processors of the present invention.

DETAILED DESCRIPTION OF THE INVENTION

Figure 1:
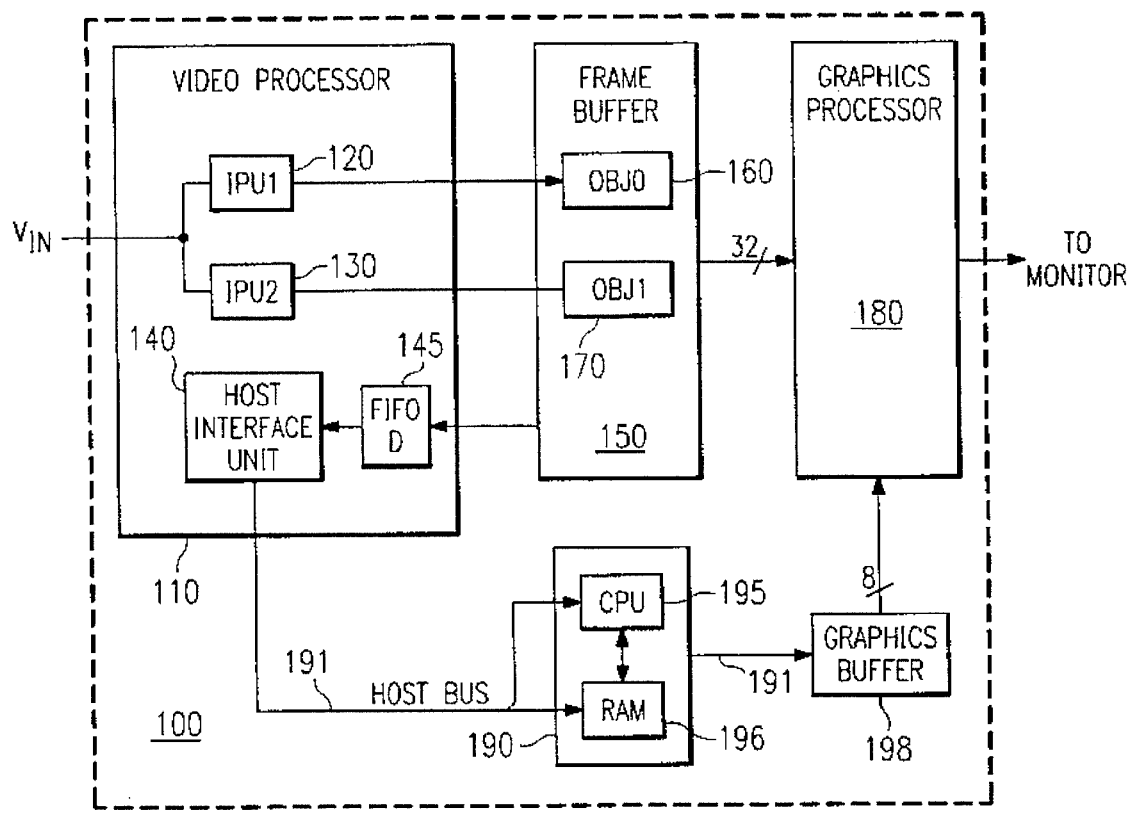
FIG. 1 is a schematic diagram of the closed-caption decoder device disclosed in the present invention.

FIG. 1 shows a closed caption decoder device embodying the teachings of the present invention. A standard television video signal, $V_{IN}$, is received by closed caption decoder device 100 on a video input channel. Input processor 120 of video processor 110 (labeled IPU1 in FIG. 1) processes the entire video image seen on the monitor of personal computer 190 and stores the captured video images in frame buffer 150 in Object 160 (labeled OBJ0 in FIG. 1). Input processor 130 (labeled IPU2 in FIG. 1) captures Line 21 of each video input frame and stores the Line 21 data in frame buffer 150 in Object 170 (labeled OBJ1 in FIG. 1). The video image in frame buffer 150 is transferred to graphics processor 180 and is eventually sent to the monitor connected to PC 190. In a preferred embodiment of the present invention, video processor 110 of closed caption decoder device 100 is a Cirrus Logic PX2070 microcircuit and graphics processor 180 is a Cirrus Logic PX2085 microcircuit. The operating parameters and functional specifications of the PX2070 and PX2085 are hereby incorporated by reference.

The video data stored in OBJ1 in frame buffer 150 contains the raw closed caption data encoded in the video signal received on input $V_{IN}$. Video processor 110 reads back the data stored in OBJ1 from frame buffer 150 using FIFO register 145 (FIFO D in a Cirrus Logic PX2070 processor) and transmits the Line 21 data through host interface unit 140 onto host bus 191 of host PC 190. After the Line 21 data is stored in RAM 196, a host program is executed by CPU 195 which processes the Line 21 data to determine the two ASCII characters which represent the closed caption data. The ASCII data retrieved from Line 21, after being processed by the CPU, is stored in graphics buffer 198 before being sent to graphics processor 180 for display in a user-defined window of the PC monitor.

The processing of Line 21 of the video frame is done in the background of the processing of the complete video image by IPU1. IPU2 decimates the Line 21 data by half in the X-direction (horizontal sweep) in order to save memory and bus bandwidth before storing the decimated Line 21 data in frame buffer 150. IPU2 does this by stripping out every other pixel pair. All of the closed caption data is stored in the intensity field; the color field has no relevance to closed caption data and hence may be dropped during the processing. The object from OBJ0 is the displayed video image. This data path is not allocated by the closed caption decoder device 100, but rather is the data path used by the client application that is running on PC 190. The IPU1 data path is shown in FIG. 1 only to indicate that while closed caption decoder device 100 is operating, the standard video stream being received on input $V_{IN}$ may still be viewed by the user.

Figure 2:
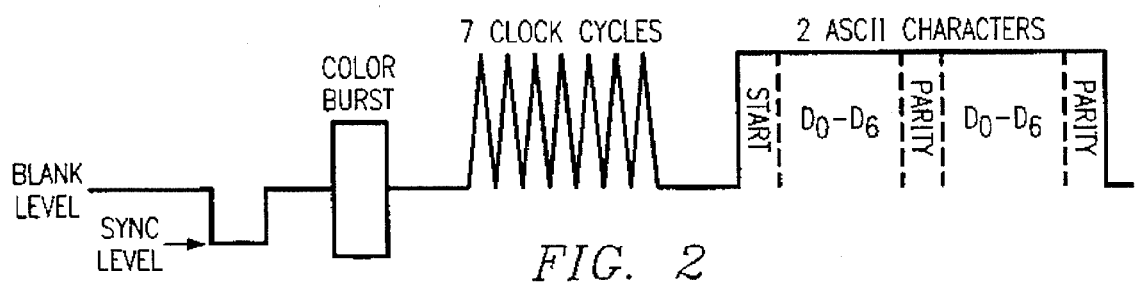
FIG. 2 is an example of the video signal line containing closed-caption character data.

FIG. 2 shows the Line 21 video signal that is captured by IPU2 of closed caption decoder device 100. The processing of the closed caption data in frame buffer 150 occurs in three steps for each line of closed caption data: 1) sampling and locking on the encoded clock, 2) sampling the two characters of closed caption data, 3) verifying the data integrity. As FIG. 2 shows, the raw data stored in frame buffer 150 contains 7 clock cycles and 2 characters of ASCII data, a start bit and 2 parity bits. In the first step of the decoding of the closed caption data, the Line 21 data is sampled to detect the clock signal. The 7 clock cycles in Line 21 are used by closed caption decoder 100 to determine the frequency at which the actual data bits in the ASCII character field must be sampled. As can be seen from FIG. 2, the data immediately after the color burst information and before the clock cycles is at or near the blanking level. This equates to a digital value at or near "0". The "0" value data is then followed by a series of 7 pulses of a non-zero amplitude. The data retrieved from frame buffer 150 is parsed from the beginning of the captured data until the peak value of the first clock cycle is found. Closed caption decoder device 100 also determines and stores the horizontal position of this peak with respect to the sync level of the Line 21 video signal. Closed caption decoder device 100 continues to parse the Line 21 data until the minimum value between clock 1 and clock 2 is found. Closed caption decoder device 100 calculates the difference between the peak value of clock cycle 1 and the minimum value between clock cycle 1 and clock cycle 2 to determine the amplitude of the clock waveform. Once the amplitude of the clock waveform is determined, closed caption decoder device 100 subtracts 20% of the amplitude from the peak variable in order to determine a logic "1" threshold. Closed caption decoder device 100 then adds 20% of the amplitude to the minimum value of the waveform between clock cycle 1 and clock cycle 2 in order to determine a logic "0" threshold. These thresholds are used to decode the data bits that follow the clock signal.

Once the logic "0" and logic "1" thresholds have been determined, the OBJ1 data stored in frame buffer 150 is further parsed until all of the peak values of each of the 7 clock cycles has been located. Using the horizontal position of each clock peak relative to the sync level of the Line 21 data, the time period between each clock peak can be determined. By averaging the time period between the clock peaks, closed caption decoder device 100 determines the rate at which to sample the closed caption data (i.e. the effective clock period).

In the second phase of the decoding process, closed caption decoder device 100 converts the serial data stream into 2 ASCII characters. As shown in FIG. 2, the data immediately after the 7 clock cycles and before the ASCII characters is at or near the blanking level. The value of these samples is therefore below the logic "0" threshold determined previously by closed caption decoder device 100. The start bit preceding the ASCII characters of the closed caption data is always a logic "1". Closed caption decoder device 100 will therefore parse the data after the clock cycles until a value larger than the logic "1" threshold has been detected.

This indicates that the start bit has been located. Closed caption decoder device 100 will then add the clock period previously determined to the current horizontal position in order to sample the data representing bit $D_0$ of the first ASCII character of closed caption data. If the value of this data is above the logic "1" threshold, $D_0$ is a logic "1". If the value of this data is below the logic "0" threshold, $D_0$ is a logic "0". This process is repeated until the logic level of all 14 ASCII bits and the 2 parity bits of the closed caption data have been determined.

In the final phase of processing the closed caption data, closed caption decoder device 100 verifies the integrity of the data. The first step is to verify the parity of the data using the parity bit following each ASCII character. The closed caption specification of the FCC regulations states that the parity scheme used must be odd parity. This implies that the total number of logic "1" data bits in $D_0$–$D_6$ and the parity bit must be odd. If this condition is found to be false, closed caption decoder device 100 will not convert the captured ASCII data into characters on the monitor of PC 190. The closed caption specification also states that the first character of the character pair determines if the pair is a control code or a part of the displayable text. The second character of the character pair is always a printable character. If closed caption decoder device 100 determines that the first character is not either a valid control character or a printable character, further decoding and processing of the 2 ASCII characters is aborted. If closed caption decoder device 100 determines that the second character is a non-printable character, the character is converted to a "space" character.

FIG. 3 depicts the logical flow of the decoding of closed caption data by the present invention. Client application 300 running on PC 190 calls closed caption decoder driver 310 in order to enable and disable the displaying of closed caption data. All application calls are made to closed caption capture layer (CCC) 315 by client application 300. Capture layer 315 extracts the Line 21 data from video processor hardware 340 using hardware driver 330 and notifies decoding layer 320 that there is data available to process. Decoding layer 320 then processes the data retrieved by capture layer 315 and displays the closed caption text on the monitor in a window specified by client application 300. The architecture used by the present invention allows the closed caption data, including control codes, cursor position, and display style, to be self-contained within closed caption decoder driver 310.

To buffer sufficient data for display without delaying the display of the data, a single line of closed caption data is written into OBJ1 of frame buffer 150 before being read out of frame buffer 150 for processing by CPU 195. Capture layer 315 retrieves the raw closed caption data on every other vertical sync and stores it in a circular line buffer in CPU memory. Once the information has been stored in the circular buffer, closed caption decoding layer 320 is notified that there is data to process. In this way, the closed caption data is captured on the odd video fields (every other vertical sync) and is transferred to the host computer on the even fields (every other vertical sync). Because the raw closed caption data contains more information than is needed to process the closed caption data, it is processed further by the present invention. The data retrieved from the video processor hardware contains brightness and color information ($YC_bC_r$). The closed caption information is contained in the brightness channel (Y) of the Line 21 video signal. The closed caption decoder layer 320 strips off the color information as it reads the data from the circular buffer prior to actually processing the closed caption information.

FIG. 4 is a logical flow diagram of the data processing portion of closed caption capture layer 315. In step 400 of FIG. 4, an interrupt service routine is executed by host CPU 195 for each vertical sync interrupt that is received. Closed caption layer 315 will first analyze the field of the video signal to determine if the odd field or the even field is being processed. During an odd field, IPU2 of video processor 110 is storing Line 21 data into frame buffer 150 connected to video processor 110. On even fields, closed caption capture layer 315 retrieves the previously stored Line 21 data and stores it in a circular buffer. In steps 415 and 425, Line 21 data is read back from frame buffer 150 through host interface unit 140 into RAM 196 of system memory in the form of a circular buffer as shown in FIG. 4. Step 430 of the interrupt service routine notifies closed caption decoding layer 320 that data is available for decoding. Closed caption decoder device 320 then strips off the color information of the video signal and samples and processes the clock cycles and ASCII characters of Line 21 data as explained above in the text accompanying FIG. 2.

Although the present invention and its advantages have been described in detail, it should be understood that various changes, substitutions and alterations can be made herein without departing from the spirit and scope of the invention as defined by the appended claims.

What is claimed is:

1. A closed caption decoder for capturing closed caption data from a television signal and displaying said closed caption data in a window of user-defined size and location on a screen of a video monitor, said decoder comprising:

a video input port for receiving said television signal;

a video processor coupled to said video input port, said video processor operable to capture at least one line of video data from a frame of said television signal, wherein said closed caption data is stored in said at least one line of video data;

a frame buffer memory coupled to said video processor for storing only a portion of said at least one line of video data; and a second processor coupled to said video processor and to said frame buffer memory for retrieving said portion of at least one line of video data from said frame buffer memory and translating said closed caption data stored in said at least one line of video data into a first ASCII character and a second ASCII character.

2. The closed caption decoder as set forth in claim 1 wherein said second processor further comprises:

means for detecting a plurality of clock pulses contained in said at least one line of video data and determining a logical "1" value associated with a peak amplitude of said plurality of clock pulses, a logical "0" value associated with a blanking level of said at least one line of video data and located between said plurality of clock pulses, and a clock period associated with a frequency of said clock pulses.

3. The closed caption decoder as set forth in claim 2 wherein said second processor further comprises:

means for detecting a start bit associated with said closed caption data, said start bit having an amplitude greater than said logical "1" value.

4. The closed caption decoder as set forth in claim 3 wherein said second processor further comprises:

means for translating said closed caption data into said first and second ASCII characters, wherein said translating means reads a plurality of sampled values of said at least one line of video data at a plurality of intervals after said start bit, each one of said plurality of intervals being a multiple of said clock period, and compares said sampled values to said logical "1" value and said logical "0" value.

5. The closed caption decoder as set forth in claim 4 wherein said second processor further comprises:

means for displaying at least one of said ASCII characters in said window.

6. The closed caption decoder as set forth in claim 4 wherein said second processor further comprises:

means for determining if said first ASCII character is a printable character or a control character.

7. The closed caption decoder as set forth in claim 4 wherein said second processor further comprises:

means for checking the parity of said first and second ASCII characters.

8. The closed caption decoder as set forth in claim 1 wherein said video processor stores only every other pair of pixel data contained in said at least one line of video data.

9. A closed caption decoder for capturing closed caption data from a television signal and displaying the closed caption data in a window of user-defined size and location on a screen of a video monitor, said decoder comprising:

a video input port for receiving said television signal;

a video processor coupled to said video port, said video processor operable to capture a line of video data containing said closed caption data from a frame of said television signal and store only a portion of said line of video data in a frame buffer memory coupled to said video processor as a plurality of pixel data, said pixel data comprising intensity data and color data; and a second processor coupled to said video processor and to said frame buffer for reading from said frame buffer memory a plurality of said intensity data and translating said intensity data into two ASCII characters.

10. The closed caption decoder as set forth in claim 9 wherein said video processor stores only every other pair of pixel data contained in said line of video data.

11. The closed caption decoder as set forth in claim 9 wherein said second processor further comprises:

means for detecting a plurality of clock pulses contained in said line of video data and determining a logical "1" value associated with a peak amplitude of said plurality of clock pulses, a logical "0" value associated with a blanking level of said at least one line of video data and located between said plurality of clock pulses, and a clock period associated with a frequency of said clock pulses.

12. The closed caption decoder as set forth in claim 11 wherein said second processor further comprises:

means for detecting a start bit associated with said closed caption data, said start bit having an amplitude greater than said logical "1" value.

13. The closed caption decoder as set forth in claim 12 wherein said second processor further comprises:

means for translating said intensity data into said first and second ASCII characters, wherein said translating means reads selected intensity data at a plurality of intervals after said start bit, each one of said plurality of intervals being a multiple of said clock period, and compares said selected intensity data to said logical "1" value and said logical "0" value.

14. The closed caption decoder as set forth in claim 13 wherein said second processor further comprises:

means for displaying at least one of said ASCII characters in said window.

15. The closed caption decoder as set forth in claim 13 wherein said second processor further comprises:

means for determining if said first ASCII character is a printable character or a control character.

16. The closed caption decoder as set forth in claim 13 wherein said second processor further comprises:

means for checking the parity of said first and second ASCII characters.

17. A method of capturing closed caption data from a television signal and displaying said closed caption data in a window of user-defined size and location on a screen of a video monitor, the method comprising:

capturing a line of video data containing the closed caption data from a frame of the television signal;

storing only a portion of the captured line of video data in a frame buffer as a plurality of pixel data, the pixel data comprising intensity data and color data; and translating the pixel data stored in the frame buffer into two ASCII characters.

18. The method as set forth in claim 17 wherein the step of capturing decimates the line of video data by storing only every other pair of pixel data contained in the line of video data.

19. The method as set forth in claim 17 wherein the step of translating comprises the substeps of:

detecting a plurality of clock pulses contained in the intensity data of the line of video data; and determining a logical "1" value associated with a peak amplitude of the plurality of clock pulses, a logical "0" value associated with a blanking level of the line of video data and located between the plurality of clock pulses, and a clock period associated with a frequency of the clock pulses.

20. The method as set forth in claim 19 wherein the step of translating comprises the substeps of:

detecting a start bit contained in the intensity data, the start bit being associated with the closed caption data and having an amplitude greater than the logical "1" value.

21. The method as set forth in claim 20 wherein the step of translating comprises the substeps of:

sampling the intensity data at a plurality of intervals after the start bit, each of the plurality of intervals being a multiple of the clock period;

comparing the sampled intensity data to the logical "1" value and the logical "0" value; and translating the results of the step of comparing the sampled intensity data into a first ASCII character and a second ASCII character.

22. The method as set forth in claim 21 including the further step of displaying at least one of the ASCII characters in the window.

* * * * *